United States Patent [19]

Kedem

[11] Patent Number: 4,497,501
[45] Date of Patent: Feb. 5, 1985

[54] PALLET TRUCK WITH HYDRAULIC LIFT
[75] Inventor: Tuval Kedem, Miami, Fla.
[73] Assignee: Equipment Company of America, Hialeah, Fla.
[21] Appl. No.: 313,411
[22] Filed: Oct. 26, 1981
[51] Int. Cl.³ .............................................. B62D 21/18
[52] U.S. Cl. ................................. 280/43.12; 254/2 R
[58] Field of Search ........................... 280/43.12, 43.23; 254/2 R, 2 B, 93 R, 93 H; 60/477

[56] References Cited
U.S. PATENT DOCUMENTS

| | | | |
|---|---|---|---|
| 2,049,335 | 7/1936 | Stephens | 60/52 |
| 2,309,138 | 1/1943 | Quayle | 254/2 |
| 2,461,212 | 2/1949 | Hanna | 280/261 |
| 2,488,521 | 11/1949 | Barrett | 280/43.12 |
| 2,993,703 | 7/1961 | Paradise | 280/43.12 |
| 3,119,627 | 1/1964 | Klumb | 280/43.12 |
| 3,188,107 | 6/1965 | Quayle | 280/43.23 |
| 3,286,985 | 11/1966 | Edera | 254/93 R |
| 3,462,167 | 8/1969 | Rateau | 280/43.12 |
| 3,567,240 | 3/1971 | Brassington | 280/43.12 |
| 3,608,922 | 9/1971 | Best et al. | 280/43.12 |
| 3,701,211 | 10/1972 | Best | 280/43.12 |
| 3,757,523 | 9/1973 | Resuggan | 60/477 |
| 3,775,027 | 11/1973 | Craft | 60/477 |
| 3,817,546 | 6/1974 | Sugiura | 280/43.12 |
| 3,843,147 | 10/1974 | Fredricson | 280/43.12 |
| 3,940,338 | 2/1976 | Bryntse et al. | 254/2 R |
| 4,223,901 | 9/1980 | Klemick | 280/43.12 |

FOREIGN PATENT DOCUMENTS 55148  7/1981  Israel .............................. 280/43.12

Primary Examiner—David M. Mitchell

Attorney, Agent, or Firm—Cullen, Sloman, Cantor, Grauer, Scott & Rutherford

[57] ABSTRACT

A pallet truck hydraulic jack has a base plate mounting a lift cylinder with a reciprocal piston or lift rod and a pump cylinder with a reciprocal pump piston. A frame mounts a pair of forks having retractable rollers at their ends and is pivotally mounted upon the base plate and operatively engaged by the lift rod for raising the frame and lowering the rollers. A hydraulic reservoir is mounted upon the base plate. A hydraulic control system includes a pivot axle depending from the base plate having a bore coaxial of the lift cylinder. A plunger piston within the axle shaft bore is connected to the lift cylinder piston rod. There are a plurality of manifold passages formed in the base plate, adapted for supplying pressurized hydraulic fluid from the pump to the plunger piston and to the lift rod, which interconnects the reservoir and the pump and interconnects the reservoir and the lift cylinder. A cartridge type directional control valve assembly within the base plate controls the flow of pressurized hydraulic fluid in the respective manifold passages so that manual actuation of the pump effects a quick lift of the frame when it is unloaded, effects an additional application of lifting force through the lift cylinder when the frame is loaded, bypasses pressurized hydraulic fluid to the reservoir when the frame is overloaded, and provides a release of pressurized hydraulic fluid from the pump cylinder and the lift plunger and returns it to the reservoir for lowering the frame and forks. The cartridge type directional control valve may be conveniently removed and replaced in the hydraulic control circuit when required in minimum time.

19 Claims, 17 Drawing Figures

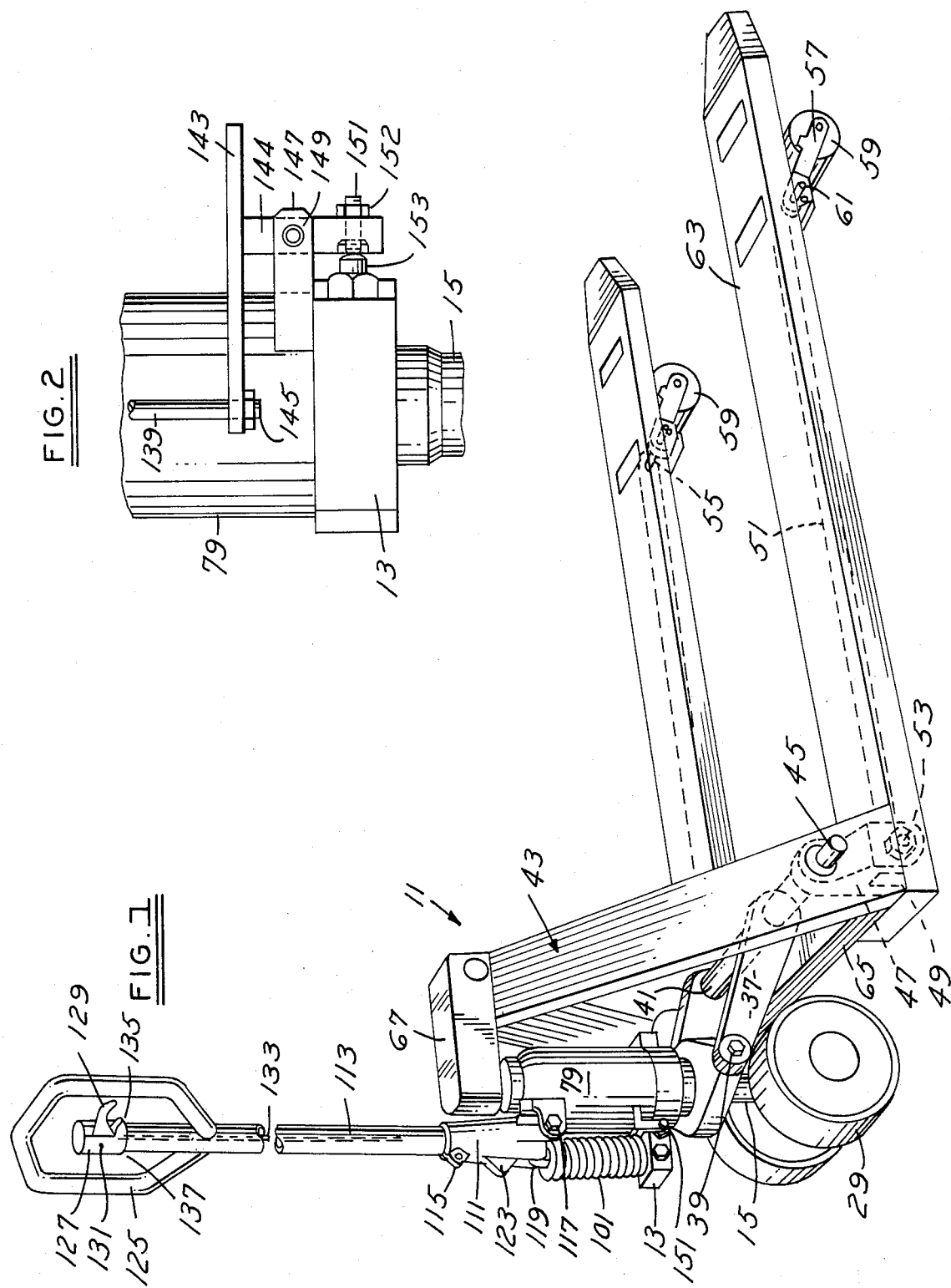

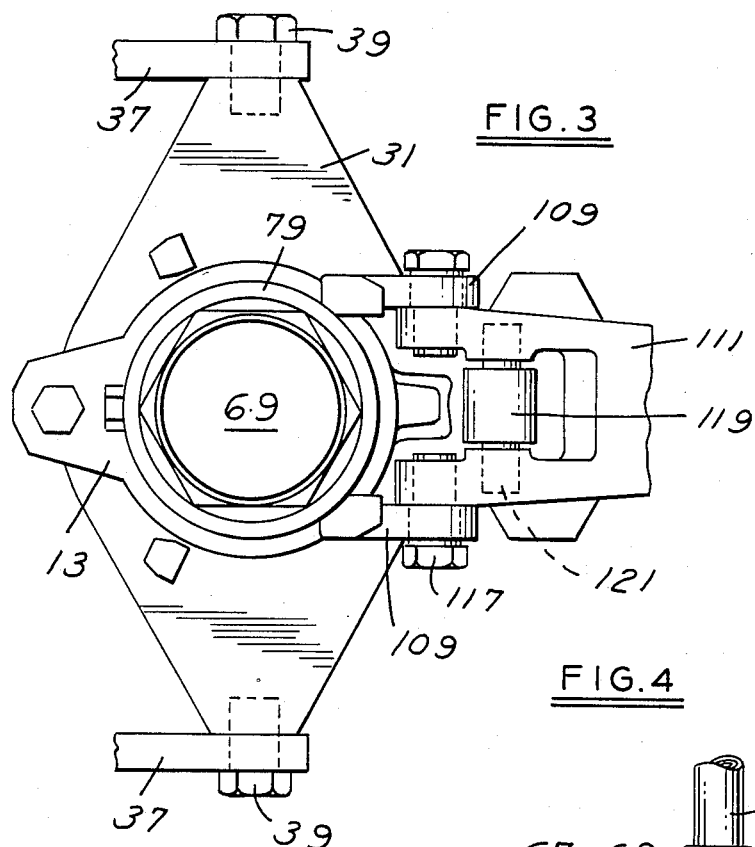
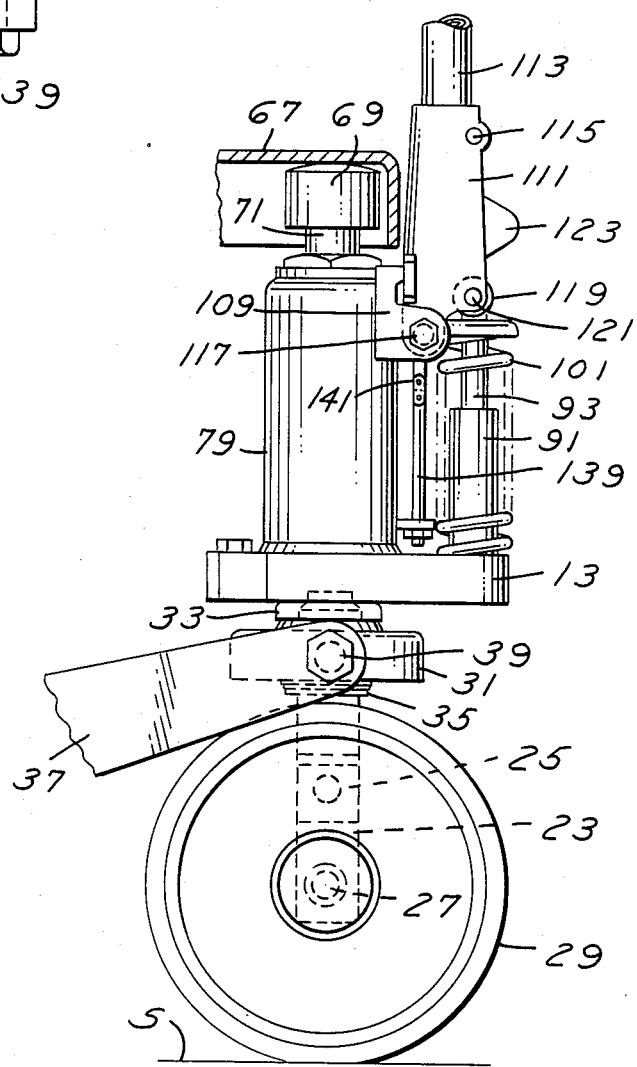

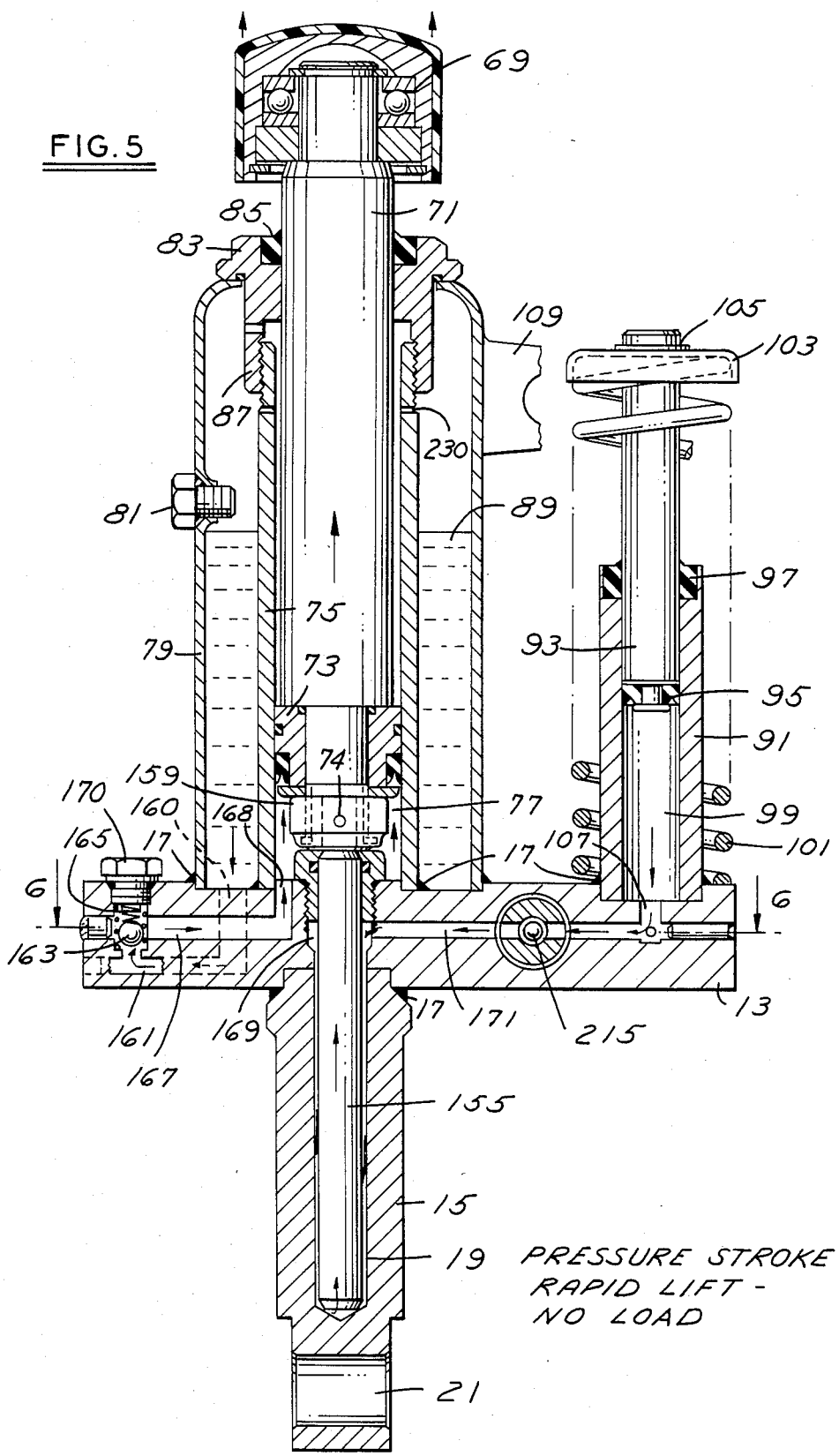

PRESSURE STROKE
RAPID LIFT - NO LOAD

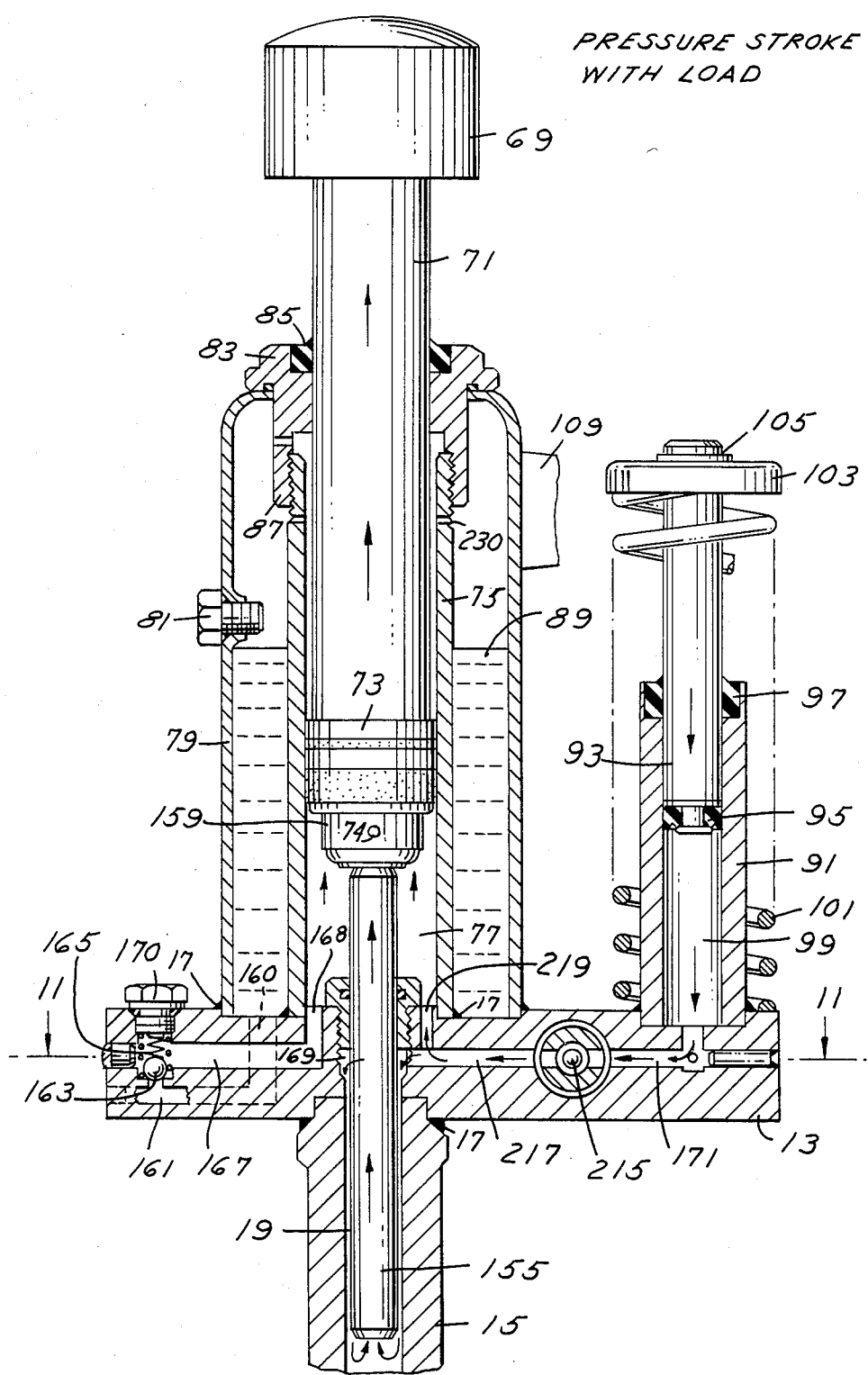

PRESSURE STROKE WITH LOAD

FIG.12 LOWERING

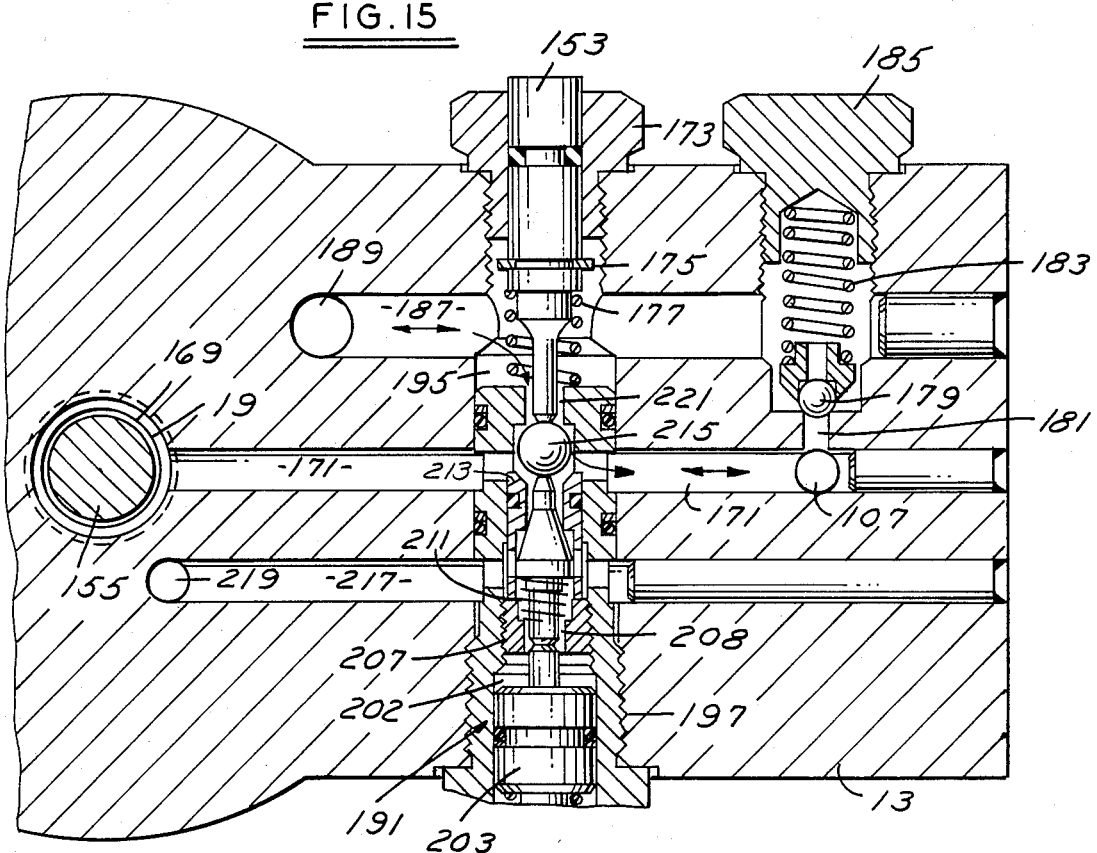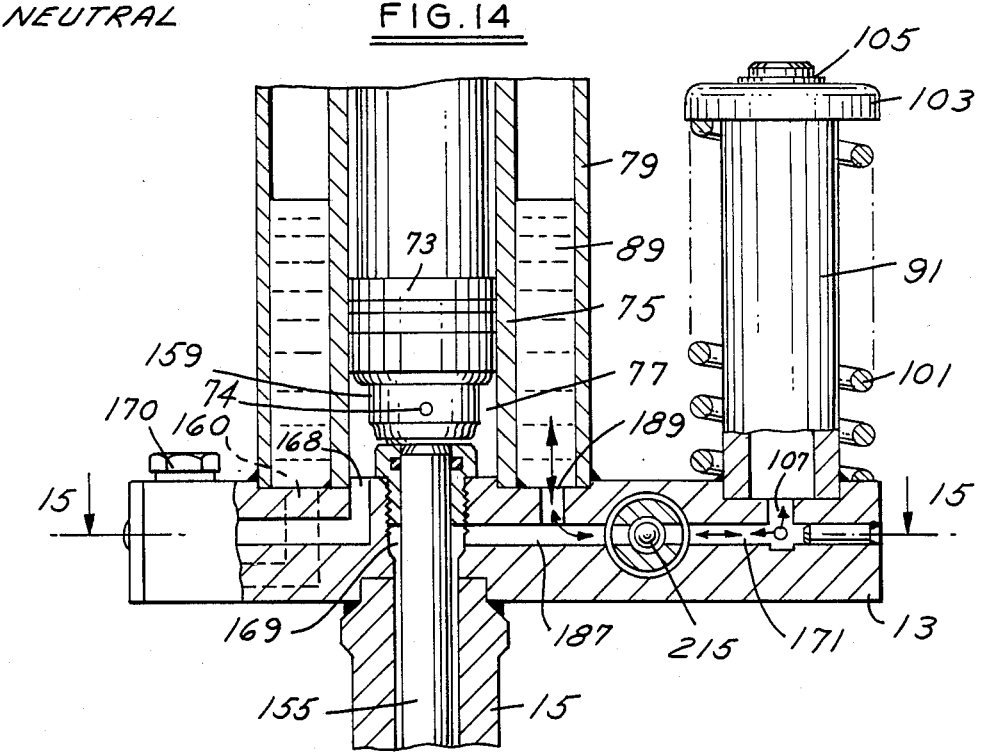

MAXIMUM LIFT OVERFLOW

OVERLOAD

PALLET TRUCK WITH HYDRAULIC LIFT

RELATED APPLICATION

The hydraulically operated pallet lift truck described herein may be provided with a mechanical emergency brake as disclosed and claimed in applicant's copending U.S. patent application entitled "Brake Assembly for Pallet Lift Truck", Ser. No. 296,103, filed Aug. 26. 1981 now U.S. Pat. No. 4,424,885, issued Jan. 10, 1984.

BACKGROUND OF THE INVENTION

1. Field of the Invention

Pallet trucks with hydraulic lift are used in industry for lifting and transporting loaded pallets and for unloading same at various locations.

2. Description of the Prior Art

The pallet truck includes a hydraulic jack supporting a frame carrying a pair of forwardly extending forks or a platform. Specifically it includes a lift cylinder supporting the frame and the connected forks or platform and a pump cylinder for providing pressurized hydraulic fluid to the lift cylinder. One commercial device which I invented is illustrated and described in the Israel patent application No. 55,148 published in Israel on Feb. 27, 1981. The application is entitled "Dual Rate Jack System For Lift Trucks" and is owned by Koor Metal, Ltd. The pallet truck hydraulic lift described therein employs a hydraulic jack of the type wherein the handle for the pallet truck is pivotally mounted upon the lift cylinder or base and is provided with a connection with the pump cylinder or pump piston so that pivotal movements of the handle actuates the pump cylinder. The forks of the pallet truck at their forward ends have retractable support rollers which are operated by suitable linkage. Upon activation of the lift cylinder raising the frame, the linkage lowers the rollers pivotally with respect to the forks. Such activation lifts the forks into engagement with the under surface of a loaded pallet. Further pumping action of the handle elevates the frame and forks thereby lifting the pallet off of the ground surface for transporting it to another location.

Other pallet truck hydraulic jack assemblies and related prior art lift devices are shown in the following U.S. patents:

| | | |
|---|---|---|
| 2,049,335 | 7-28-36 | Stephens |
| 2,309,138 | 1-26-43 | Quayle |
| 2,461,212 | 2-8-49 | Hanna |
| 3,462,167 | 8-19-69 | Rateau |
| 2,488,521 | 11-22-49 | Barrett |
| 2,993,703 | 7-25-61 | Paradise |
| 3,118,107 | 6-8-65 | Quale |
| 3,119,627 | 1-28-64 | Klumb |
| 3,286,985 | 11-22-49 | Barrett |
| 2,993,703 | 7-25-61 | Paradise |
| 3,118,107 | 6-8-65 | Quale |
| 3,119,627 | 1-28-64 | Klumb |
| 3,286,985 | 11-22-66 | Edera |
| 3,567,240 | 3-2-71 | Brassington |
| 3,608,922 | 9-28-71 | Best et al |
| 3,701,211 | 10-31-72 | Best |
| 3,757,523 | 9-11-73 | Resuggan |
| 3,775,027 | 11-27-73 | Craft |
| 3,817,546 | 6-18-74 | Suguira |
| 3,843,147 | 10-22-74 | Fredricson |
| 3,940,338 | 2-24-76 | Btyntse, et al |

It is well known that a hydraulic pallet truck for lifting and transporting of pallets and heavy loads having the following basic elements: a hydraulic jack, a frame, steering wheels, and load rollers. The hydraulic jack is comprised of a handle operated pump mounted on a base plate under which is mounted a vertical pivot axle for the articulated steering wheels, and two concentric cylinders with dual diameter and a dual rate lifting piston. Such are described in the aforementioned Israeli patent application.

SUMMARY OF THE PRESENT INVENTION

The present invention relates primarily to a pallet truck with hydraulic lift which significantly reduces operational efforts, by utilizing a manually lever operated pump to provide the mechanical advantage for the hydraulic lifting of the platform or the forks of the pallet lift truck in two different lifting ratios per pump stroke. The first ratio is a rapid-lift with no load. At such time the hydraulic lift device requires only a single stroke of the pump to raise the platform or forks of the pallet truck to engage the load. The second ratio occurs at normal lift under load. At such time the hydraulic control system or hydraulic lift raises the forks or platform of the pallet truck by decreasing the lift ratio and increasing the mechanical advantage. This feature has certain economical advantages in that it saves time and labor by allowing or permitting the operator to raise any height pallet with a maximum of three pump strokes.

The present invention provides for the interaction of three basic elements of a hydraulic lifting unit or control system which includes: a lifting mechanism, as an example, in the form of a dual diameter piston; a pumping mechanism, as an example, in the form of a pump piston and cylinder device; and a control mechanism which includes a removable and replaceable cartridge type directional control valve assembly which cooperates with a secondary fluid supply system.

The cartridge type directional control valve assembly or mechanism is provided with a novel rapid-lift load sensor or load-sensing actuator which enables the platform or the forks of the pallet truck to be hydraulically raised to contact a load in a single stroke of the pump handle thereby providing for rapid-lifting and change over to a normal lifting speed upon engagement of the load with the platform or forks. The hydraulic lifting unit incorporates a mechanical control for lowering the platform or forks and for operating and steering the pallet truck in a neutral mode.

Thus it is a feature of the present invention to provide a hydraulic control system incorporating a lifting mechanism, a pumping mechanism and a control mechanism in the form of a cartridge type directional control valve assembly provided with a built in load-sensing actuator or sensor. With such a construction the sensor or actuator automatically actuates the directional control valve thus diverting the pressurized fluid to desired port.

Another feature of the present invention is to provide a hydraulic control system including a combined directional control valve assembly and load sensor actuator which results in improved efficiency by its positively open or closed condition allowing free flow of hydraulic fluid to desired port without restriction or flow friction.

Still another feature of the present invention is to provide a cartridge type directional control valve assembly of the aforementioned type which is mechanically actuated to provide other functions required in the hydraulic control system.

A further feature of the present invention is to provide a cartridge type directional control valve which contains various ports, passages and a series of valve elements, all arranged compactly, with the valve elements being axially aligned and actuated one by another.

A still further feature of the present invention is to provide a base plate forming a manifold and having a manifold type bore for the replaceable cartridge type directional control valve. In such a construction the base plate has the necessary hydraulic flow passages for the ports and passages of the control valve and further includes a mechanical actuator or pressure pin for actuating the directional control valve.

Another feature of the present invention is to provide in a hydraulic control system or a lifting unit a cartridge type directional control valve which includes as one of the valve elements a cone valve which provides precise flow control of the hydraulic fluid for operating and controlling the lowering speed of the associated pallet truck or other lifting device.

Still another feature of the present invention is to provide in the hydraulic lift or circuit a secondary fluid supply system consisting of passages containing a check valve in the base plate enabling free flow of the hydraulic fluid in one direction from the reservoir to the lift cylinder during the rapid-lift stroke or operation and maintaining hydraulic pressure during the other operational modes.

A further feature of the present invention resides in the construction of the dual diameter lifting-piston assembly and the matching dual concentric cylinders. This positively connected dual diameter-piston enables the lifting mechanism to operate with the hydraulic control system as a highly efficient dual rate jack. This improvement eliminates the need for additional passages and additional control valves in the multi-function hydraulic system as utilized in the prior art.

Another feature of the present invention is to provide a pallet truck hydraulic jack having a base plate mounting an upright lift cylinder and a pump cylinder together with a frame adjustably mounted upon the base plate and connected to the lift cylinder wherein the frame mounts a platform or a pair of spaced horizontal forks with retractable rollers at their one ends, activation of the lift cylinder raising the frame and simultaneously lowering the rollers relative to the forks.

Still another feature includes a manually operable pump upon a base plate having passages formed within the base plate whereby upward movement of the pump piston withdraws hydraulic fluid from a reservoir through one such passage and into the pump cylinder and wherein manual downward movement of the pump piston delivers pressurized hydraulic fluid to the plunger piston bore for providing a rapid lifting of an unloaded frame and connected forks with respect to a pallet.

A further feature incorporates in conjunction with a lift cylinder, a directional control valve assembly or mechanism wherein upon the forks and frame encountering a loaded pallet for lifting thereof the control valve mechanism automatically responds so that pressure fluid at an increased force is additionally delivered through an additional passage through the base plate to the lift cylinder to augment the lifting force initially provided by the plunger piston for elevating said frame and forks mounting a loaded pallet.

A still further feature incorporates into the framework retractable roller assemblies at the forward ends of the forks wherein upon power elevation of the frame, the support rollers are lowered relative to the forks elevating the forks and the loaded pallet thereon.

Another feature includes within the hydraulic control system additional passages within the base plate which interconnect the reservoir and the intake to the pump so that upon the suction movement of the pump piston hydraulic fluid is delivered from the reservoir to the pump. Upon operation of the directional control valve located in the base plate and on downward movement of the pump piston, the connection to the reservoir is blocked, and hydraulic fluid under pressure is delivered in one or more passages selectively to the plunger piston and to the lift cylinder.

Still another feature includes an overload valve means by which upon an overload of the forks and frame and to protect the hydraulic jack, a bypass valving is incorporated into the hydraulic control mechanism whereby excess hydraulic fluid is returned to the reservoir.

A further feature incorporates in the hydraulic control system a rapid lift load sensor wherein with a minimum load or with the pallet unloaded, there will be a fast lifting with the frame and forks or platform with respect to the pallet upon a single activation of the pump piston. In such a construction when the forks or platform engages the loaded pallet, the control valve mechanism is operative to overcome the load sensor and to provide for the delivery of supporting pressurized hydraulic fluid directly to the lift cylinder which works in conjunction with the pressurized hydraulic fluid delivered to the plunger piston aligned with the lift piston and rod.

A still further feature is directed to the construction of the pallet truck wherein the lift cylinder mounted upon a base plate provides lifting power to a framework with projecting forks wherein the framework is pivotally mounted upon the same base plate. Activation of the lift cylinder and auxiliary plunger in alignment with the lift cylinder causes lifting of the frame with respect to the base plate and at the same time through a suitable linkage causes a lowering of the rollers relative to the forks, in effect raising the forks relative to the ground surface.

Another feature includes a manual control mechanism associated with the handle assembly for the pallet truck and wherein the handle assembly serves as an activating device for the pump cylinder and further contains a manual control assembly for the hydraulic control system such that in one position of the control lever, such as the lowermost "lift" position, pressurized fluid from the pump will be delivered to the plunger piston for elevating the rod within the lift cylinder for a fast lifting action with respect to an unloaded pallet and wherein when the control lever is in a neutral position, the hydraulic fluid control arrangement is such that there is a free passage of liquid back and forth between the reservoir and pump cylinder, with no movement, and wherein a further movement of the control lever to a "lowering" position operates the hydraulic control mechanism so as to unblock the passages to permit the return of pressure fluid from the respective cylinders to the reservoir for a fast lowering of the frame and forks and the loaded pallet thereon.

These and other features will be seen from the following specification and claims in conjunction with the appended drawings.

BRIEF DESCRIPTION OF THE DRAWINGS

FIG. 1 is a fragmentary side perspective view of the pallet truck provided with a hydraulic lift.

FIG. 2 is a similar view on an increased scale of the portion of the lift cylinder shown in FIG. 1 and the manual control for the pressure pin for the hydraulic directional control valve mechanism.

FIG. 3 is a fragmentary plan view on an increased scale with respect to FIG. 1 illustrating the support trunnion for the framework and the handle pivotal mounting for the pump cylinder shown in FIG. 1.

FIG. 4 is a fragmentary side elevational view taken from the left side of the pallet truck shown in FIG. 1 with the handle assembly fragmentarily shown in its spring biased retracted position.

FIG. 5 is a vertical section taken through the base plate and through the axis of the lift and pump cylinders shown in FIG. 1, on an increased scale illustrating a part of the hydraulic circuit.

FIG. 10 is a fragmentary vertical section similar to FIG. 5, illustrating the hydraulic connections between the pump and lift cylinder corresponding to the pressure stroke of the pump with a load applied to the lift cylinder.

FIG. 14 is a fragmentary vertical section of the hydraulic connections when the control is in a neutral mode establishing fluid communication between the pump and the reservoir.

FIG. 15 is a corresponding fragmentary plan section taken in the direction of arrows 15—15 of FIG. 14.

Figure 6:
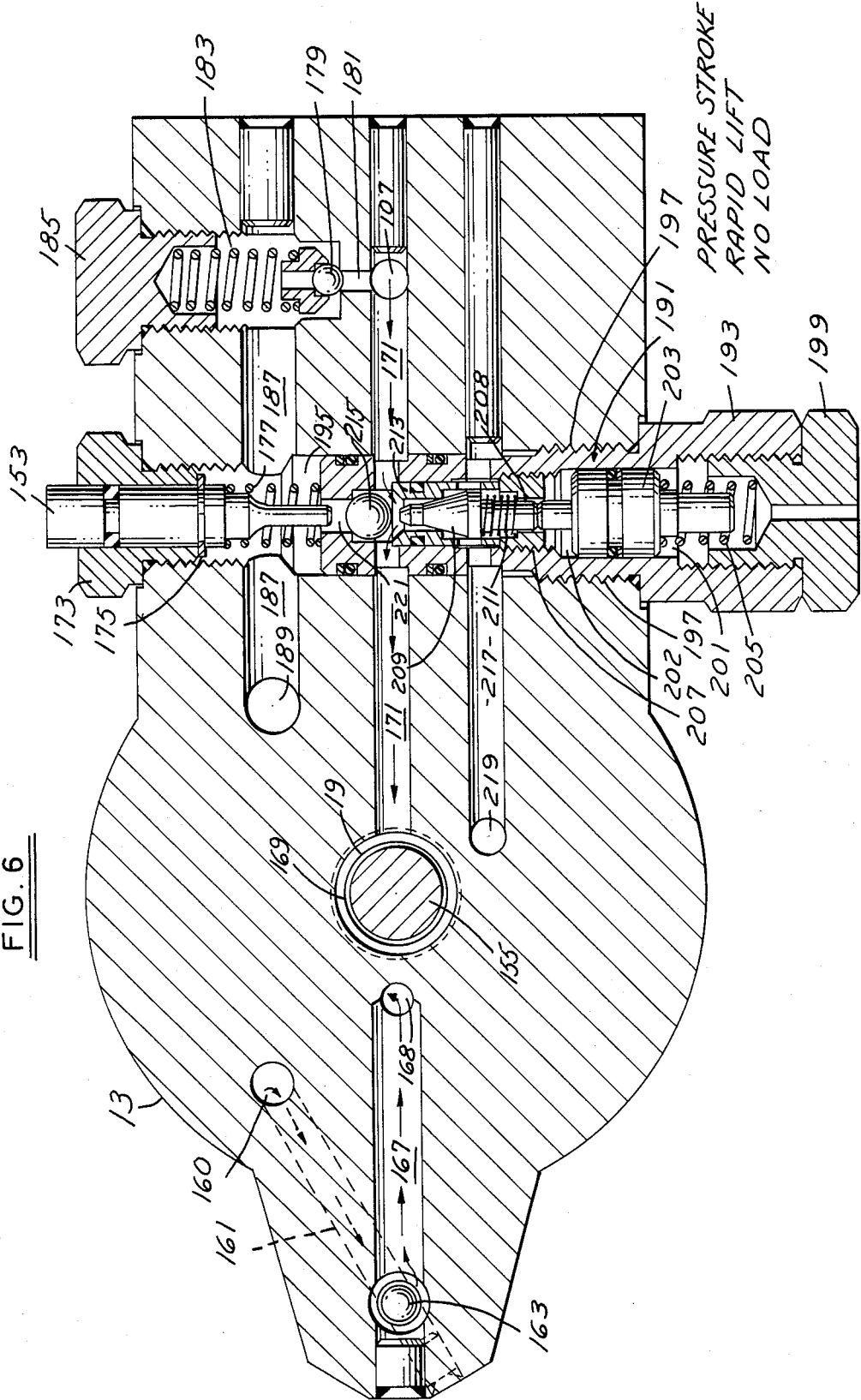
FIG. 6 is a plan view on an increased scale, in section, taken in the direction of arrows 6—6 of FIG. 5 and illustrating the respective passages forming a part of the hydraulic control mechanism or system corresponding to the pressure stroke of the pump for rapid lift with no load.

It will be understood that the above drawings illustrate merely a preferred embodiment of the pallet truck with hydraulic lift, and that other embodiments are contemplated within the scope of the claims hereinafter set forth.

DETAILED DESCRIPTION OF A PREFERRED EMBODIMENT OF THE INVENTION

The present invention, while relating primarily to a hydraulic lifting unit or system for a pallet truck, can also be applied to other kinds of lifting devices which include a hydraulic pump and control valve such as hydraulic service jacks, hydraulic cranes, hydraulic tables, hydraulic platforms etc.

Referring to FIGS. 1, 2, 3 and 4 of the drawings, the present hydraulic jack or lift, generally indicated at 11 for the pallet truck of FIG. 1 includes an elongated base plate 13 and depending therefrom an upright pivot axle 15 secured to base plate 13 as by welds 17, FIG. 5. Axle 15 has an elongated bore 19 and a transverse wheel assembly mount bore 21 adjacent its lower end.

The upright axle support yoke 23 receives the lower end of pivot axle 15 and is connected thereto by pivot pin 25 which extends through the transverse bore 21. Accordingly, the pivot yoke 23 is adapted for pivotal movements in a vertical plane about the axis of bore 21. Transverse axle 27 extends through yoke 23 and is suitably secured thereto and mounts upon its opposite ends a pair of wheels 29, each having a tire covering of polyurethane.

Transverse trunnion has a central aperture and receives pivot axle 15. Thrust bearing 33 is mounted upon the pivot axle 15 upon the top portion of the trunnion 31 and a retaining ring 35 engages the pivot axle 15 below trunnion 31 for supporting the trunnion for rotary movement relative to the pivot axle 15.

In the basic construction of the pallet truck, there is employed a pair of parallel spaced mount arms 37 at their one ends pivotally connected at 39 to two opposite ends of the trunnion 31. The opposite ends of the mount arms 37 receive the transversely extending actuator shaft 41 which is secured to the arms 37 as by welding. The actuator shaft 41 extends through lower portions of the diverging side plates of the A frame 43 and adjacent its ends is rotatably mounted thereon at 45 as best illustrated in FIG. 1.

Actuator yokes 47 are positioned within the frame 43 and secured at their upper ends to the actuator shaft 41 and at their lower ends have a depending clevis 49 pivotally connected at 53 to the respective push rods 51 nested longitudinally within undersurface portions of the platform or parallel spaced forks 63. The pair of parallel spaced horizontally disposed forks 63 at their one ends are secured as at 65 to lower portions of frame 43 and project forwardly thereof, as shown in FIG. 1.

Load rollers 59 are journaled upon yokes 57 pivotally mounted to outer end portions of the forks 63 as at 61. Upper portions of the yokes 57 are pivotally connected to the ends of the push rods 51 as at 55. The load rollers 59 are shown in FIG. 1 in a retractive position relative to the forks 63, and upon activation of the lift or main cylinder 75, FIG. 5 for elevating the frame 43 and through the linkage 37, 41, 49, 51, 55 and 57, the load rollers 59 are mechanically lowered with respect to the forks 63, in effect raising the forks 63 with respect to the ground surface S as shown in FIG. 4. Frame 43 includes at its upper end the rearwardly extending frame lift cap 67 which overlies the covered swivel head 69 upon the upper end of the lift rod 71 shown in FIG. 5.

The lift rod 71 at its lower end mounts the piston means or element 73 within the hydraulic lift cylinder 75 within which it is suitably sealed for reciprocal movement within chamber 77 therein. The upright reservoir 79, adapted to contain hydraulic fluid such as oil at 89, is mounted concentrically of the main cylinder or lift cylinder 75 upon the base plate 13 and is secured thereto as by the welds 17.

The reservoir 79 has a fill plug 81 threaded thereinto and at its upper end mounts the piston or lift rod bearing 83 which depends within the upper end portion of the reservoir 79 and threadedly engages the upper end of the lift cylinder 75 as at 87. A suitable rod wiper 85 is nested and retained within the lift rod bearing 83 and is adapted for cooperative sealing engagement with the reciprocal lift rod 71.

Upright pump cylinder 91 is arranged rearwardly and spaced from lift cylinder 75 and the reservoir 79 with respect to the assembly shown in FIG. 1 and is mounted upon the base plate 13 and suitably secured thereto as by the welds 17. The reciprocal pump piston 93 is movably mounted within the pump bore 99. The piston 93 mounts a pump seal 95 at its lower end. The pump piston wiper and seal 97 is nested and retained within the upper end of the pump cylinder 91, surrounds and sealingly engages reciprocal pump piston 93.

The elongated coil compression spring 101 surrounds the pump cylinder 91 at its lower end bears against the base plate 13 and at its upper end mounts the spring cap 103 secured to pump piston 93 by retaining ring 105. The coil spring 101 normally urges the pump piston 93 to the elevated or lift stroke suction position shown in FIG. 5.

The lower end of the pump cylinder 91 has a pump outlet 107 by which hydraulic fluid from the reservoir 79 may enter the pump chamber 99 on suction retraction movement of the pump piston 93 under the action of the coil spring 101. Upon subsequent downward compressive movement thereof pressurized hydraulic fluid will flow outwardly of the pump outlet 107.

A handle support 109 of bifurcated form is secured to a portion of the reservoir 79 as in FIGS. 1 and 5 and receives one end of the handle housing 111 pivotally connected thereto by pivot bolt 117. The handle assembly including the tubular handle 113 projects down into the handle housing 111 and is secured thereto by fastener 115, FIG. 4. Transverse pressure roller 119 is mounted upon the axle 121 outwardly of and parallel to the pivot mounting 117 and is normally in registry with the pump piston 93 as shown in FIGS. 1 and 4.

The tubular handle 113 shown in FIG. 1 is adapted for manual pivotal movement through an arc of approximately 80 degrees, by grasping the apertured grip 125 at the upper end of the handle 113 and for effecting the downward pumping action of the pump piston 93 within the pump cylinder 91 for delivering pressurized hydraulic fluid therefrom through the pump outlet 107.

There is provided upon the handle housing 111 a laterally extending triangularly shaped brake actuator boss 123 which is adapted when the handle 113 has been rotated into a substantially horizontal position to operate a suitable braking mechanism which may be applied to the truck wheels 29 should this be desired. Accordingly, in those situations where it is desired to apply a brake to the wheels 29 of the pallet truck retaining the truck against accidental movement, a downward pivotal movement of the handle 113 will move the brake actuator 123 into a braking device, not shown, which is adapted for frictional retaining engagement with the wheels 29 for holding the wheels 29 in a stationary position. This brake assembly is disclosed and claimed in Applicant's copending United States patent application referred to at the beginning of this application.

The apertured handle grip 125 receives the upper end of the tubular handle 113 and is suitably secured thereto as by welding. Support 127 is mounted upon the upper end of the handle 113 within the handle grip 125 and supports the control lever 129 pivotally mounted upon the lever support 127 as by the transverse pivot pin 131.

The control lever 129 has a lowermost "lift" position, an intermediate "neutral" position, and an elevated "lowering" position. An elongated control rod 133 is positioned within the tubular handle 113 and at its upper end is pivotally connected to the control lever at 137. Locking lever 135 is pivotally mounted upon the control lever 129 and is adapted to operatively engage the upper end of the handle 113 when the control lever 129 has been moved to its uppermost "lowering" position.

The control rod 133 extends the length of the handle 113 and at its lower end is connected to one end of a roller link chain 141, FIG. 4 which in turn at its lower end is pivotally connected to the upper end of the pull rod 139 shown in FIG. 2. Rocker pedal 143 of T shape, at one end is connected to the lower end of the pull rod 139 by the lock nut 145. The rocker pedal 143 has a depending arm 144 which extends through and is pivotally mounted as at 149 upon the pedal support 147 suitably secured to the lower end of the reservoir 79.

Set screw 151 is adjustably positioned upon the arm 144 and secured in position by lock nut 152. The inner end of set screw 151 is adapted for operative engagement with pressure pin 153 shown in FIG. 6. The pressure pin 153 is shown in the normal "lift" position to which it is biased by the coiled spring 177 and retained with respect to the pressure pin guide 173 upon the base plate 13 by the snap ring 175.

As shown in FIG. 5, loosely within the elongated bore 19 in the pivot axle 15 is an elongated plunger piston 155, which at its upper end projects through base plate 13, through the plunger guide 157 and is in operative axial engagement with the piston securing nut 159 threaded onto the lift rod 71 for securing the piston means 73 thereon. Furthermore, the plunger piston 155 is positively or mechanically connected to the lift rod 71 by the solid pin 74 thereby creating or forming a dual diameter piston assembly.

The lower end of the reservoir 79, FIG. 5 has an outlet 160, sometimes referred to as the reservoir second outlet, connected to passage 161 which communicates with passage 167 within the base plate outletting at 168 into the lift cylinder bore 77. The respective connected passages 161 and 167 are hereafter sometimes referred to as a second passage within the base plate 13. Ball check valve 163 is interposed between passages 161 and 167 and is normally seated by spring 165 forming a part of the ball check assembly 170.

The upper end of the bore 19 terminates in the annular inlet 169 at one end of the passage 171, sometimes referred to as the first passage within base plate 13. The passage 171 at its opposite end is in communication with the outlet 107 of the pump cylinder 91 as shown in FIG. 6.

Ball relief valve 179, FIG. 6, sometimes referred to as an overload bypass or relief valve, is normally seated over the passage 181 in the base plate 13 which communicates with the pump outlet 107. The relief spring 183 normally biases the valve 179 to the position shown in FIG. 6 and is adjustably secured in position by the plug 185 threaded into the base plate 13.

At the lower end of the reservoir 79 is an outlet port 189 in communication with passage 187, sometimes referred to as the fourth passage, within the base plate 13, which at its other end extends to the bypass valve 179 and communicates with the passage 181, FIG. 6.

As a part of the hydraulic control mechanism or system for the present combination lift cylinder and lift pump, there is provided a removable and replaceable cartridge assembly 191, generally indicated in FIG. 6, which includes an elongated cartridge housing 193 which is threaded into the transverse bore 195 within the base plate at 197. The cartridge plug 199 is threaded into the outer end of the cartridge housing 193 adjacent the bore 201 therein within which is movably mounted the change over piston 203 having a suitable sealing O-ring thereon, there being a coil spring 205 interposed between cartridge plug 199 and one end of the change over piston 203. The spring biased piston 203 is sometimes referred to as a load sensor or pressure sensor. The plug 199 has a vent passage for venting the chamber of coil spring 205.

As a part of the cartridge assembly 191, there is positioned within the cartridge housing 193, the valve retaining screw 207 which is centrally apertured and loosely receives the shank of the cone valve 209, sometimes referred to as the first valve. The coil spring 211 is nested within the valve retaining screw 207 and bears against the cone valve 209 which is normally seated with respect to a central aperture within the cone valve insert seat 213 and which is adapted to normally establish communication between the first passage 171 and passage 217 which is sometimes referred to as the third passage.

The steel ball 215 is a floating ball which is nested within the cartridge assembly 191 is sometimes referred to as a first valve means or a ball check valve. Under some circumstances the ball 215 may be in the seated position, FIG. 6 with respect to the bore 221 which communicates with the bore 195 which communicates with the fourth passage 187.

A passage 217 formed within the base plate 13 at one end is in communication with the cylinder inlet 219 and at its opposite end is in communication with the tapered valve 209 and the bore within which it is nested.

OPERATION

Pressure Stroke-Rapid Lift-No Load

Figure 8:
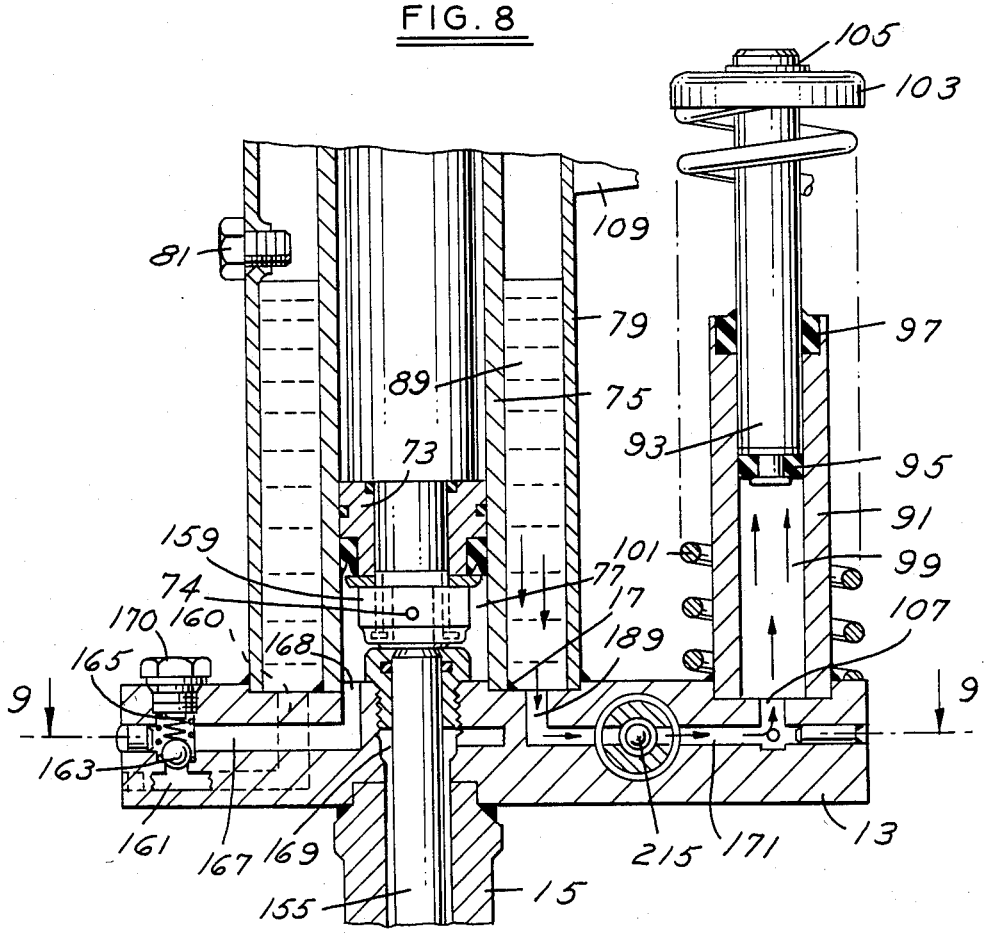
FIG. 8 is a fragmentary vertical sectional view similar to FIG. 5 showing the hydraulic connections between the reservoir and the pump cylinder on the suction stroke of the pump.

With the control lever 129, FIG. 1 in its lowermost position, being a "lift" position, the piston 93 of the pump cylinder 91 is retracted to the lift suction position shown in FIG. 8 under the action of the coil spring 101. The previous elevation of the piston 93 creates a low pressure condition in the chamber 99 which through the pump outlet 107 and channel 171 is in communication with the reservoir outlet 189 and the passage 187 through the transverse bore 221 shown in FIG. 9.

Figure 9:
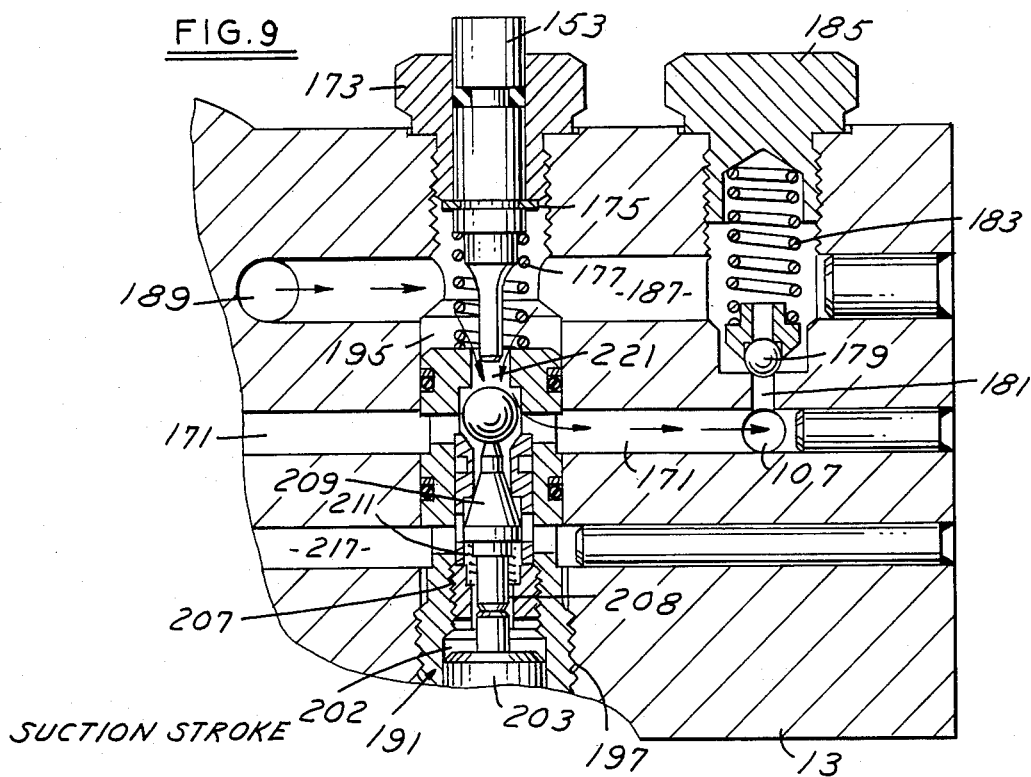
FIG. 9 is a fragmentary plan section taken in the direction of arrows 9—9 of FIG. 8.

Under the suction created by the upward movement of the piston 93, the floating ball 215 is unseated from the position shown in FIG. 6 to the position of FIG. 9 to permit the flow of hydraulic fluid from the reservoir 79 through its outlet 189.

Thereafter, assuming the lift truck 11, FIG. 1 has been moved to the position so that the respective forks 63 underlie a pallet that is loaded, the initial downward pivotal movement of the handle 113 from the position shown in FIG. 1 80 degrees, acting through the roller 119, presses the pump piston 193 to a lowermost position.

The flow of pressurized hydraulic fluid, as shown in FIGS. 5 and 6 is through the pump outlet 107, through the passage 171, past the ball 215 and through passage 171, FIG. 6, to the annular aperture 169 which leads to the bore 19 thereby applying pressurized hydraulic fluid to the plunger piston 155, FIG. 5. Since the piston or lift rod 71 is then unloaded with the forks 73 being out of engagement with the overlying pallet, this initial action causes the plunger piston 155 to elevate from the position shown in FIG. 5 effecting a corresponding axial upward movement with the piston rod 71 and the swivel head 69. Therefore, by a rapid action and a single stroke of handle 113, the piston assembly 71 and 69 is moved upwardly into lifting engagement with the frame 43. This is referred to as a rapid lift no load pressure stroke.

As shown in FIG. 6, there is a third passage 217 within the base plate 13 which is normally closed off from the first passage 171 by the spring biased seated cone valve 209 with respect to the seat 213 including spring 211.

The cone valve 209 is furthermore yieldably seated, FIG. 6, by the load sensor piston assembly 203 including the compression spring 205. The load sensor 203 normally maintains the cone valve 209 in the seated position shown so that for the limited no load condition described, the pressure fluid from the pump cylinder 91 is delivered to only the plunger piston 155 through the first passage 171.

Since this has caused an upward movement of the piston means 73 and lift rod 71 in FIG. 5 creating a reduced pressure condition within chamber 77 thereunder, some of the hydraulic fluid 89 is withdrawn from reservoir 79 through the outlet 160 and through the second passage 161 and passage 167 past the ball check 163 entering the lower end of the cylinder 75 at 168. The withdrawn portion of hydraulic fluid 89 is then trapped in chamber 77 by the check valve 163 preventing the lift rod or cylinder 71 and the connected plunger piston 155 from retracting during the next suction stroke of pump piston 93.

Figure 7:
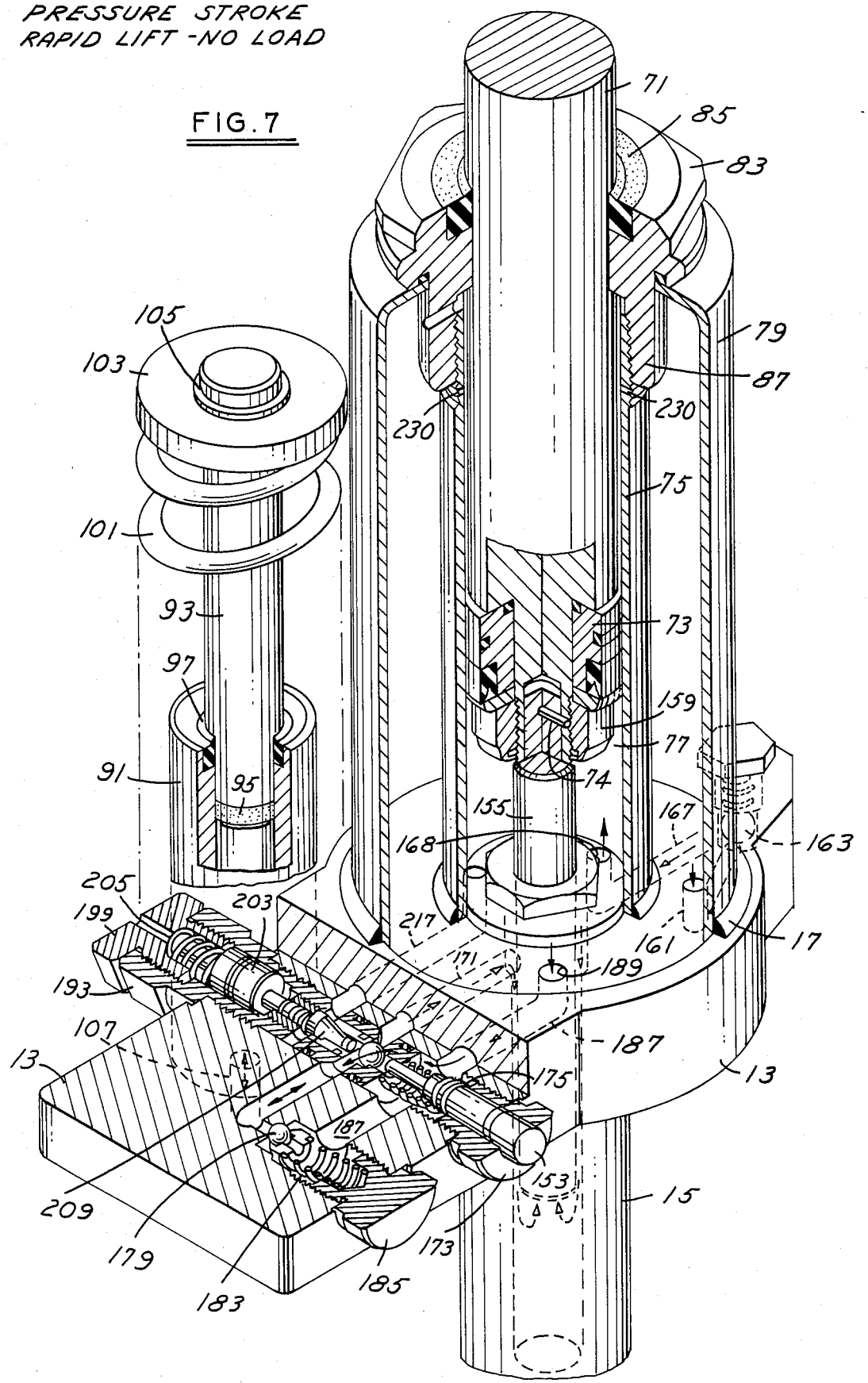
FIG. 7 is a partly broken away perspective view, partly in section of the base plate mounted lift and pump cylinders and illustrating the arrangement of the hydraulic control mechanism corresponding to pressure stroke of the pump for rapid lift with no load.

The above described functions and operation of the hydraulic jack or lift mechanism are further shown in the broken away perspective view, FIG. 7. The above described initial suction stroke is designated by the arrows in FIGS. 8 and 9. The rapid lift no load pressure stroke is designated by the arrows in FIGS. 5 and 6.

Pressure Stroke with Load

In order for the lift truck to elevate the loaded pallet, there is a further pumping action of the handle 113 pressurizing the hydraulic fluid within chamber 99 of the pump, and with the loaded pallet thereby creating some resistance to the flow of pressurized hydraulic fluid in the first passage 171, the pressure developed is sufficient to unseat the cone valve 209 with respect to the pressure sensor 203 including spring 205, FIG. 6. Thus, pressurized hydraulic fluid from the pump outlet 107 passes through the first passage 171 to activate the plunger piston 155 providing an axial upward thrust to the piston or lift rod 71. At the same time, however, additional pressurized hydraulic fluid passes through the cartridge assembly 191 past the unseated cone valve 209 and into the passage 208, and chamber 202, FIG. 11. This pressurized hydraulic fluid activates the load sensor piston 203 retracting it fully and disengaging it from the cone valve 209. The load sensor piston 203 remains fully retracted due to back pressure from chamber 77 as long as load is applied to the lifting cylinder or rod 71. Now the first passage 171 can communicate directly with the third passage 217 producing an additional lifting force within chamber 77 acting upon the piston means 73 and piston or lift rod 71 for further forcefully elevating the rod 71 in conjunction with the lifting force provided by the piston plunger 155. Thus, several pumping strokes of the handle 113 may be required to elevate the loaded pallet from the unloaded position of the forks shown in FIG. 1.

Figure 11:
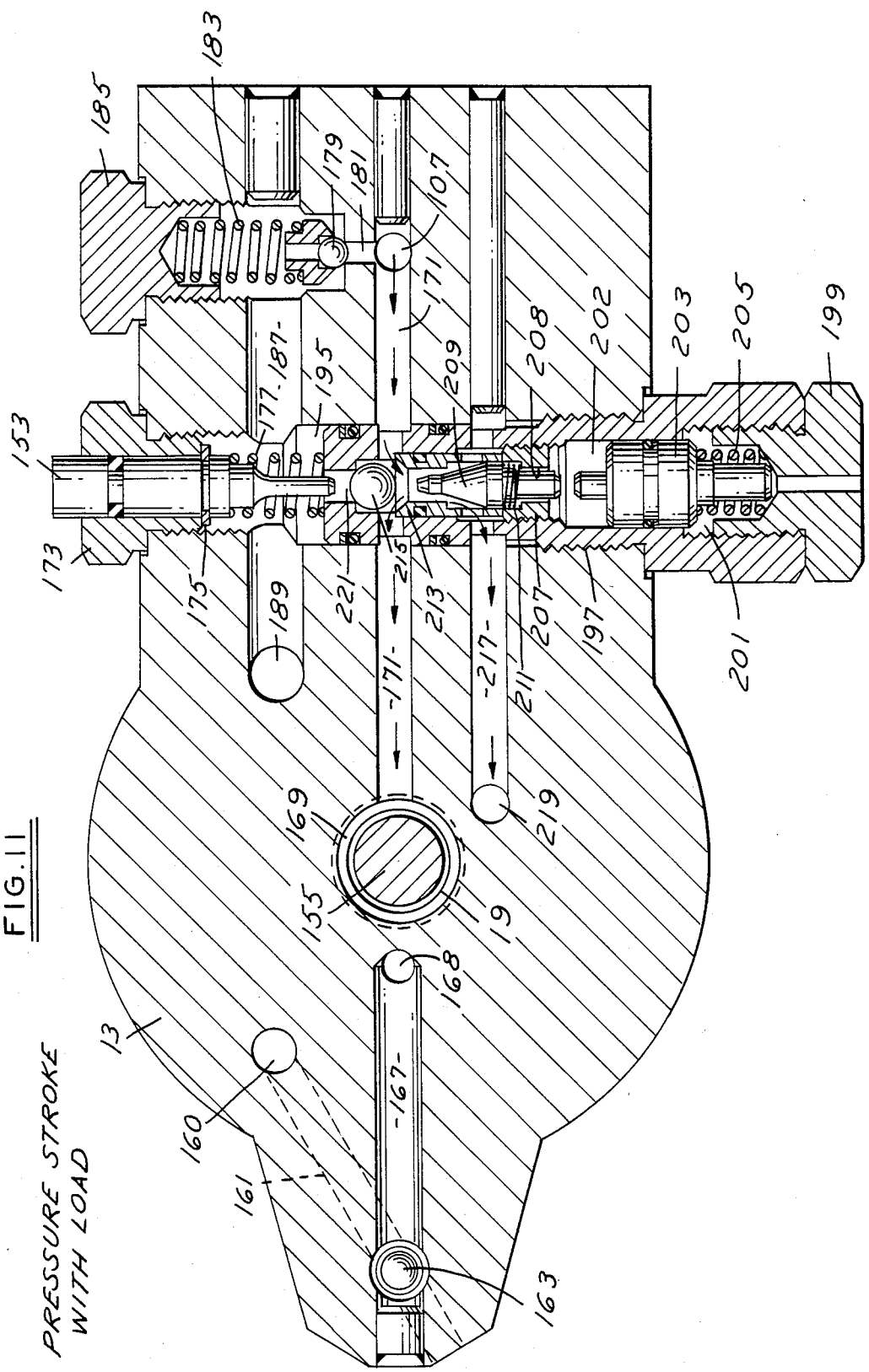
FIG. 11 is a corresponding plan section taken in the direction of arrows 11—11 of FIG. 10, on an increased scale.

This arrangement and the unseating of the cone valve 209 is shown furthermore in FIG. 11 and wherein the pressurized hydraulic fluid from the outlet 107 of the pump passes through both the first and third passages 171 and 217 for in conjunction elevating the piston or lift rod 71, and the connected piston plunger 155 in axial registry therewith as well as the swivel head 69 which engages undersurface portions of the lift cap 67 forming a part of frame 43, FIG. 1.

This lifting action of the piston 71 and associated swivel head 69 elevates the frame 43 causing a pivotal movement of the lift arms 37 in a counterclockwise direction from the position shown in FIG. 1. The actuator shaft 41 journaled upon the framework 43 is rotating in a counterclockwise direction similarly rotating the pair of actuator yokes 47. This advances longitudinally the respective push rods 51 within the forks 63. The push rods 51 at their forward ends are pivotally connected as at 55 to the roller mounting yokes 57 rotating the yokes 57 in a clockwise direction. This effects a corresponding elevation of the loaded forks 63, so that the forks and the complete frame assembly including the support wheels 29 may be moved over a support surface S to the point of use. The arrows shown in FIGS. 10 and 11 designate the hydraulic flow during the pressure stroke with load.

Lowering

In order to lower the loaded pallet supported upon the elevated frame 43 and forks 63, the control lever 129 is elevated to its uppermost "lowering" position from what is shown in FIG. 1. It is retained in this position by latch lever 135.

This effects an upward movement of the control rod 133 within handle 113 which as shown at FIGS. 2 and 4 is connected by the chain 141 to the pull rod 139. This causes a clockwise rotation of the rocker pedal 143 about the pivot mounting 149. The set screw 151 is in operative engagement with the normally retracted pressure pin 153 which in the initial operation is biased to the retracted position shown in FIG. 6 as by the coil spring 177.

Figure 12:
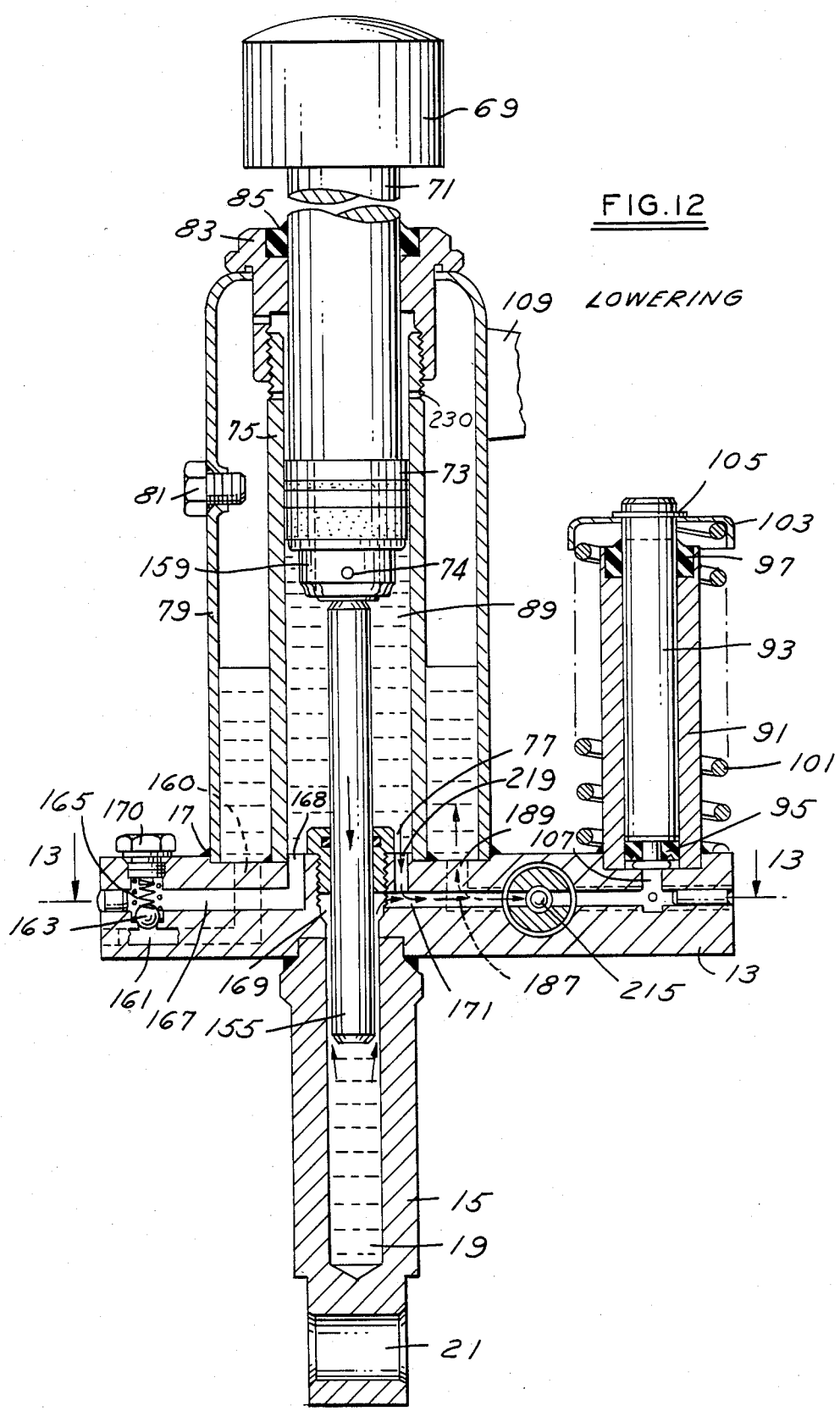
FIG. 12 is a fragmentary vertical section showing the hydraulic connections between the pump and lift cylinder and plunger piston in a lowering mode with hydraulic fluid under pressure returning to the reservoir.
Figure 13:
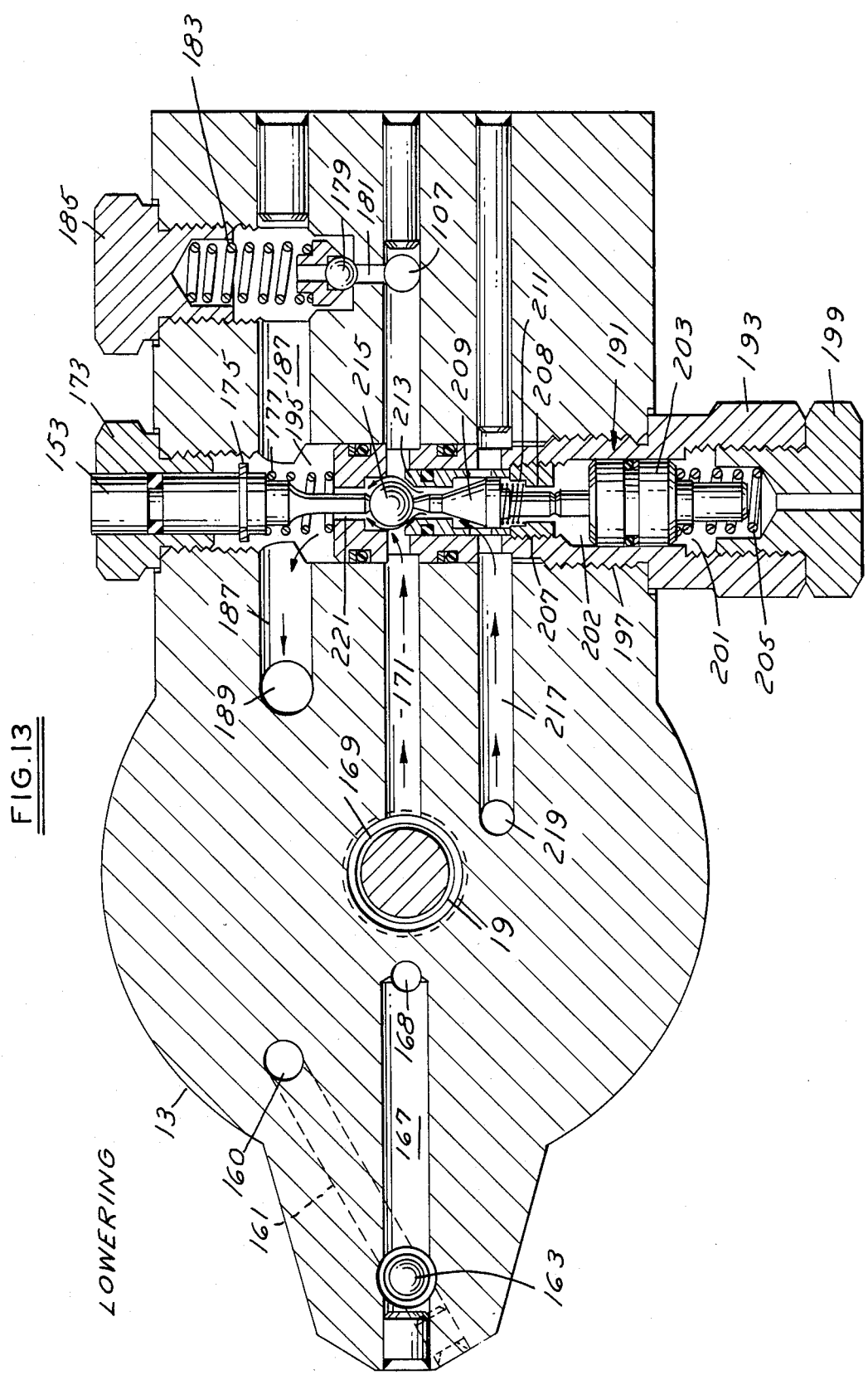
FIG. 13 is a corresponding plan section taken in the direction of arrows 13—13 of FIG. 12, on an increased scale.

It is this upward movement of the control lever 129 which has been caused by the above described linkage an inward movement of the pressure pin 153 from the position shown in FIG. 6 to the position shown in FIG. 13. This inward movement of the pressure pin 153 has first unseated the ball 215 and at the same time the ball 215 has unseated the cone valve 209. The load upon the framework 43 including the forks 63 causes the pressurized hydraulic fluid within chamber 77 of the main cylinder 75 as well as the pressurized hydraulic fluid within the bore 19 to return by the respective passages 171 and 217 past the cone valve 209 and past the ball valve 215 returning to the reservoir 79 through passage 187 and the reservoir outlet 189. This is further shown in FIG. 12 as indicated by the arrows. This lowering will cause a refilling of the reservoir 79 with the hydraulic fluid earlier pressurized for lifting the loaded pallet.

Neutral

The control lever 129 has an intermediate "neutral" position as in FIG. 1. The linkage 143–144, 149, 151 has moved the pressure pin 153 to an intermediate position as shown in FIGS. 14 and 15. Here the ball 215 has been unseated from the position shown in FIG. 6 with respect to the bore 221. However, there has not been sufficient inward movement of the pressure pin 153 as would unseat the cone valve 209, thereby maintaining pressure in chamber 77 prohibiting movement of the lifting cylinder or rod 71.

At this time, communication is established only between the pump outlet 107, the corresponding first passage 171, the bore 221 with the ball 215 unseated and the fourth passage 187 and the reservoir outlet 189. Accordingly, in such intermediate position, should there be any pumping action upon the handle 113, this would only move the hydraulic fluid back and forth between the pump chamber 99 and the reservoir 79. Other than that, there would be no pumping action causing any lifting movements.

Overload

Figure 16:
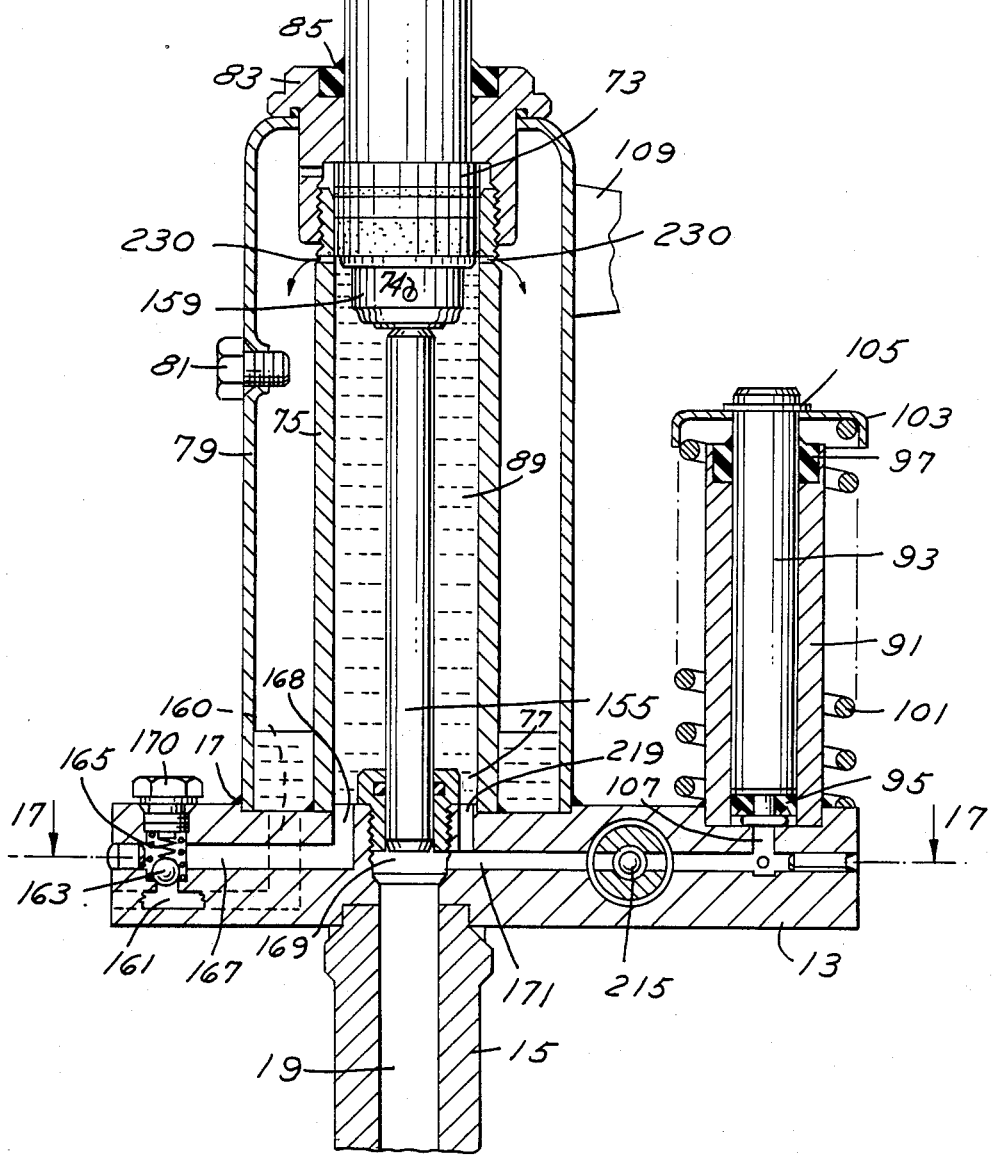
FIG. 16 is a fragmentary vertical elevational section showing the hydraulic connections corresponding to a maximum lift condition with some hydraulic fluid under pressure being directed back to the reservoir.
Figure 17:
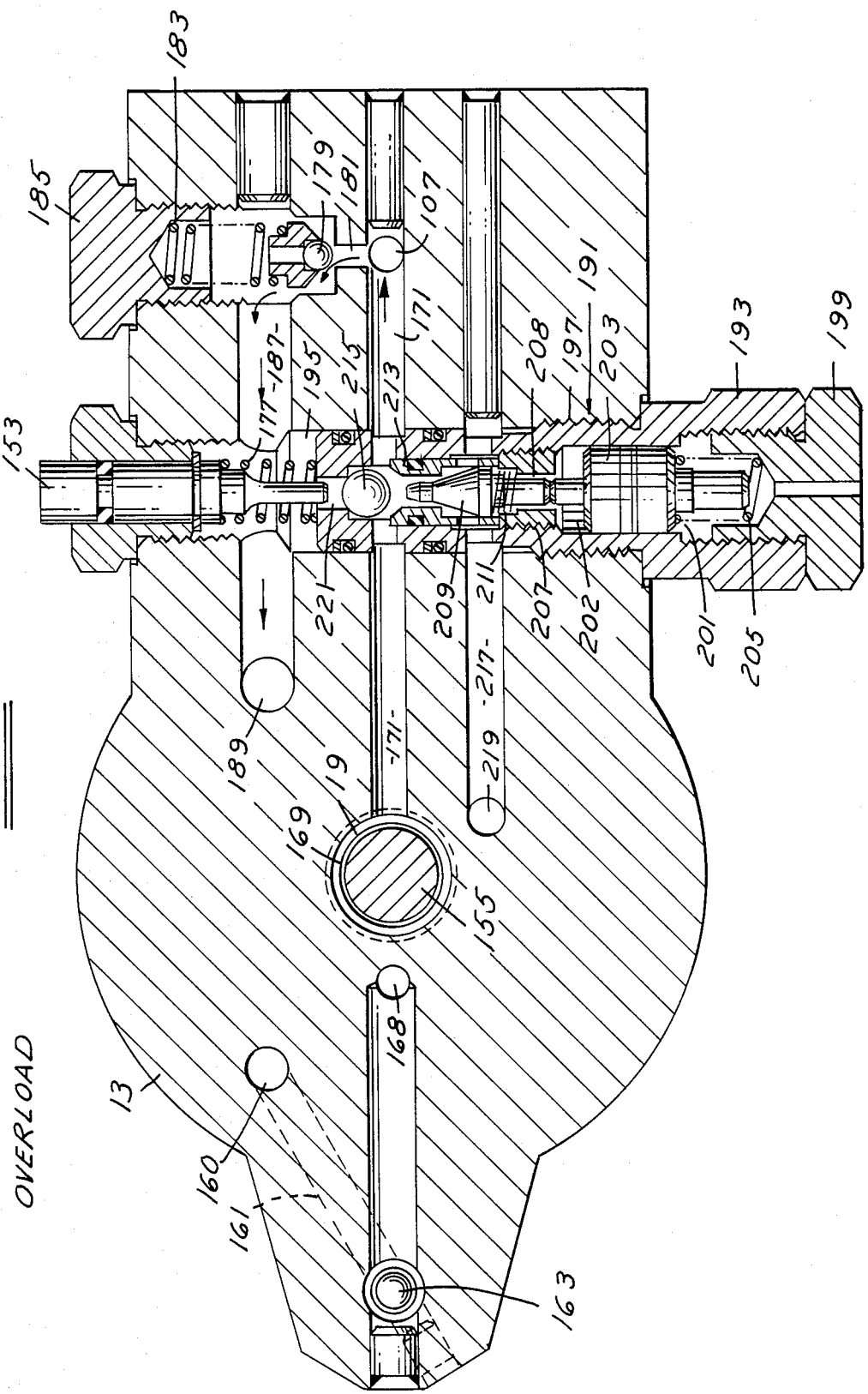
FIG. 17 is a plan section taken in the direction of arrows 17—17 of FIG. 16, on an increased scale, showing hydraulic connections corresponding to the overload condition with hydraulic fluid under excess pressure being diverted back to the reservoir.

In situations where there is a considerable over load upon the pallet, in order to prevent damage to the pallet truck and/or the hydraulic jack 11 provision is made as shown schematically in FIG. 17 wherein the excess pressurized hydraulic fluid from the outlet 107 is effective to unseat the overload ball relief valve 179 FIG. 6, being normally seated by the coil spring 183. This overload unseats the ball valve 179 and excess pressurized hydraulic fluid is delivered through the passage 181, past the ball valve 179 and into a portion of the fourth passage 187 and through the outlet 189 back into the reservoir 79, such as shown additionally in FIG. 16.

Maximum Lift

The upper end portion of the upright lift cylinder 75 is provided with three overflow holes 230, FIG. 16, which returns excess pressurized hydraulic fluid in lift cylinder 75 directly to the reservoir 79 as indicated by the arrows, FIG. 16. Thus when the lift rod 71 reaches its maximum height or lift and prior to the unseating of the relief valve 179 as has already occurred in FIG. 17, the excess hydraulic fluid overflows into the surrounding reservoir 79 as shown in FIG. 16. In such a mode the pressure pin 153 is normally extended by the spring 177; the ball valve 215 is closed by the pressure from the pump cylinder 91; the cone valve 209 is closed by back pressure in the cylinder 91; relief valve 179 is closed by the pressure of spring 183; check valve 163 is closed by the differential pressure between the cylinder and reservoir (pressure in cylinder); and the change over piston 203 is moved back and disengaged from the cone valve 209 by the pressurized hydraulic fluid in the system.

SUMMARY

A summary of the operations and functions of the moving parts of the hydraulic lifting unit or control system is set forth in the following table, on the next page, with reference being made to the drawings and modes of operation:

| MODES OF OPERATION | POSITION OF MOVING PARTS | | | | | |
|---|---|---|---|---|---|---|
| | PRESSURE PIN (153) | FLOATING VALVE (215) | CONE VALVE (209) | RELIEF VALVE (179) | CHECK VALVE (163) | CHANGE OVER PISTON (203) |
| SUCTION STROKE (FIGS. 8 & 9) | Extended by spring pressure | Opened by suction from pump | Closed Depressed by change over piston load | Closed by spring pressure | Closed by spring pressure | Depressing cone valve to closed position by spring pressure |
| PRESSURE STROKE RAPID-LIFT-NO LOAD (FIGS. 5, 6 & 7) | Extended by spring pressure | Closed by pressure from pump | Closed Depressed by change over piston load | Closed by spring pressure | Opened by differential pressure between cylinder and reservoir (vacuum in cylinder) | Depressing cone valve to closed position by spring pressure |
| PRESSURE STROKE WITH LOAD (FIGS. 10 & 11) | Extended by spring pressure | Closed by pressure from pump | Opened by pressure from pump disengaged from change over piston | Closed by spring pressure | Closed by differential pressure between cylinder and reservoir (pressure in cylinder) | Moved back and disengaged from cone valve by high pressure in system |
| NEUTRAL (FIGS. 14 & 15) | Partially Depressed | Opened by pressure pin | Closed by back pressure in cylinder | Closed by spring pressure | Closed by differential pressure between cylinder and reservoir (pressure in cylinder) | Moved back and disengaged from cone valve by high pressure in system |
| LOWERING (FIGS. 12 & 13) | Fully depressed | Opened by pressure pin | Opened by floating valve being depressed by pressure pin | Closed by spring pressure | Closed by differential pressure between cylinder and reservoir (pressure in cylinder) | Moved back by pressure pin depressing floating & cone valves |
| OVERLOAD (FIGS. 16 & 17) | Extended by spring pressure | Closed by pressure from pump | Closed by back pressure in cylinder | Opened by pressure from pump | Closed by differential pressure between cylinder and reservoir (pressure in cylinder) | Moved back and disengaged from cone valve by high pressure in system |
| MAXIMUM LIFT (FIGS. 16 & 17) | Extended by spring pressure | Closed by pressure from pump | Closed by back pressure in cylinder | Closed by spring pressure | Closed by differential pressure between cylinder and reservoir (pressure in cylinder) | Moved back and disengaged from cone valve by high pressure in system |

Having described my invention, reference should now be had to the following claims:

I claim:

1. In a hydraulic lifting unit having a base plate mounting an upright lift cylinder having therein a reciprocal combined lift rod and piston means and a pump cylinder having a pump outlet and a manually reciprocal pump piston projecting therefrom;
   a hydraulic control mechanism secured to and depending from said base plate, said control mechanism having an elongated bore extending axially of and communicating with said lift cylinder;
   a plunger piston positioned within and projecting from said bore, through said base plate and at one end secured to said lift piston means;
   there being a first passage in said base plate interconnecting said pump cylinder outlet and said bore;
   a reservoir mounted upon said base plate containing hydraulic fluid and having a first outlet communicating with said first passage for directing hydraulic fluid into said pump cylinder upon its suction stroke;
   first valve means adjacent said first passage blocking pressurized hydraulic fluid from said reservoir first outlet;
   downward movement of said pump piston directing pressurized hydraulic fluid to said bore thereby lifting said plunger piston and said lift cylinder piston means and rod;
   said reservoir having a second outlet;
   there being a second passage in said base plate at one end communicating with said second outlet and at its other end communicating with said lift cylinder;
   upward movement of its piston means drawing hydraulic fluid from said reservoir into said lift cylinder.

2. In the hydraulic lifting unit of claim 1, a normally seated valve means in said second passage.

3. In the hydraulic lifting unit of claim 1, said first valve means being a ball check valve in the connection between said reservoir first outlet and said first passage.

4. In the hydraulic lifting unit of claim 1, spring means interposed between said pump cylinder and pump piston normally biasing said pump piston to a retracted position;

an elongated pump handle at one end pivotally mounted upon said lift cylinder and at its other end having a grip;

a pressure roller on said handle spaced from its pivot mounting and in registry with said pump piston, said spring means normally maintaining said handle in an upright position, manually rotating said handle up to 80 degrees, approximately, effecting downward movement of said pump piston compressing said spring means.

5. In the hydraulic lifting unit of claim 4, the pivot mounting of said pump handle including a handle housing secured over said one end of said handle, upon one side pivoted upon said lift cylinder, said pressure roller being mounted upon the opposite side of said handle housing.

6. In the hydraulic lifting unit of claim 4, said spring means being a coiled compression spring mounted upon said base plate concentrically of said pump cylinder.

7. In the hydraulic lifting unit of claim 1, said reservoir being concentric to said lift cylinder.

8. In a hydraulic lifting unit having a base plate mounting an upright lift cylinder having therein a reciprocal combined lift rod and piston means and a pump cylinder having a pump outlet and a manually reciprocal pump piston projecting therefrom;

a hydraulic control mechanism secured to and depending from said base plate, said control mechanism having an elongated bore extending axially of and communicating with said lift cylinder;

a plunger piston positioned within and projecting from said bore, through said base plate and at one end secured to said lift piston means;

there being a first passage in said base plate interconnecting said pump cylinder outlet and said bore;

a reservoir mounted upon said base plate containing hydraulic fluid and having a first outlet communicating with said first passage for directing hydraulic fluid into said pump cylinder upon its suction stroke;

first valve means adjacent said first passage blocking pressurized hydraulic fliud from said reservoir first oulet;

downward movement of said pump piston directing pressurized hydraulic fluid to said bore thereby lifting said plunger piston and said lift cylinder piston means and rod;

an apertured cartridge valve assembly within said base plate having a bore communicating with said first passage, there being a third passage in said base plate interconnecting said valve assembly bore and said lift cylinder;

and a spring biased normally seated first valve in said latter bore closing communication between said first and third passages;

increased hydraulic pressure being applied to said first passage when said lift cylinder piston means is loaded, unseating said first valve, pressurized hydraulic fluid feeding into said lift cylinder and applying an increased lifting force to said piston means.

9. In the hydraulic lifting unit of claim 8, said reservoir first outlet communicating with said valve assembly bore;

said first valve means being a ball check valve within said valve assembly bore.

10. In the hydraulic lifting unit of claim 8, there being a fourth passage in said base plate interconnecting said reservoir first outlet and said valve assembly bore;

said first valve means being a ball check valve in said valve assembly bore for blocking pressurized hydraulic fluid from said first passage to said fourth passage.

11. In the hydraulic lifting unit of claim 8, the biasing of said first valve in said valve assembly including an adjustable rapid lift load sensor changeover piston nested and sealed in said valve assembly bore at one end axially and yieldably engaging said first valve;

and a coil spring within said bore engaging the other end of said changeover piston.

12. In the hydraulic lifting unit of claim 10, said fourth passage extending to said pump cylinder outlet;

and a normally closed overload bypass valve in said fourth passage;

maximum pressurized hydraulic fluid when applied to said first and third passages to said lift cylinder opening said bypass valve for fluid communication to said fourth passage and to said reservoir.

13. In the hydraulic lifting unit of claim 10, said upward movement of said pump piston drawing hydraulic fluid through said fourth passage, past said ball check valve and into said first passage.

14. In the hydraulic lifting unit of claim 10, a normally retracted spring biased pressure pin in said base plate coaxial to and normally spaced from said ball check valve;

manual inward movement of said pressure pin moving said ball check valve into engagement and unseating said first valve within said valve assembly;

the load acting on said lift cylinder piston means returning hydraulic fluid from said bore and lift cylinder through said first and third passages past said first valve and ball check valve through said fourth passage and into said reservoir.

15. In the hydraulic lifting unit of claim 14, said pressure pin having a "neutral" position intermediate its "retracted" and "advanced" position wherein said ball check valve is unseated establishing communication between said fourth passage to said reservoir and said first passage to said pump cylinder, said first valve remaining seated.

16. In the hydraulic lifting unit of claim 11 wherein said cartridge valve assembly including said load sensor changeover piston is threadedly mounted as a unit in said base plate and may be removed and replaced when required.

17. In a hydraulic lifting unit having a base plate mounting an upright lift cylinder having therein a reciprocal combined lift rod and piston means and a pump cylinder having a pump outlet and a manually reciprocal pump piston projecting therefrom;

a hydraulic control mechanism secured to and depending from said base plate, said control mechanism having an elongated bore extending axially of and communicating with said lift cylinder;

a plunger piston positioned within and projecting from said bore, through said base plate and at one end secured to said lift piston means;

there being a first passage in said base plate interconnecting said pump cylinder outlet and said bore;

a reservoir mounted upon said base plate containing hydraulic fluid and having a first outlet communicating with said first passage for directing hydraulic fluid into said pump cylinder upon its suction stroke;

first valve means adjacent said first passage blocking pressurized hydraulic fluid from said reservoir first outlet;

downward movement of said pump piston directing pressurized hydraulic fluid to said bore thereby lifting said plunger piston and said lift cylinder piston means and rod;

an elongated tubular pump handle pivotally mounted upon said base plate operably engageable with said pump piston and having a grip, said handle projecting into said grip;

a control lever within said grip projected into and pivotally mounted upon said handle;

said control lever having a lower "lift" position, an intermediate "neutral" position, and an upper "lowering" position;

an aperture cartridge valve assembly within said base plate having a bore communicating with said first passage, there being a third passage in said base plate interconnecting said valve assembly bore and said lift cylinder;

a spring biased normally seated first valve in said latter bore closing communication between said first and third passages;

increased hydraulic pressure being applied to said first passage when said lift cylinder piston means is loaded, unseating said first valve, pressurized hydraulic fluid feeding into said lift cylinder and applying an increased lifting force to said lift piston means;

there being a fourth passage in said base plate interconnecting said reservoir first outlet and said valve assembly bore;

said first valve means being a ball check valve in said valve assembly bore for blocking pressurized hydraulic fluid from said first passage to said fourth passage;

a normally retracted spring biased pressure pin in said base plate coaxial to and normally spaced from said ball check valve;

manual inward movement of said pressure pin moving said ball check valve into engagement with and useating said first valve within said valve assembly;

the load acting on said lift cylinder piston returning hydraulic fluid from said bore and lift cylinder through said first and third passages past said first valve and ball check valve through said fourth passage and into said reservoir;

and a linkage means interconnecting said control lever and said pressure pin, and including a control rod nested within said handle at one end pivotally connected to said control lever;

said pressure pin being retracted with the control lever in a lift position, said pressure pin being in a neutral intermediate position when said control lever is in a neutral position;

said pressure pin being in an advanced position to unseat said first valve when the control lever is in a lowering position.

18. In the hydraulic lifting unit of claim 17, said linkage means further including a rocker pedal pivotally mounted upon said lift cylinder and engaging said pressure pin;

and a flexible linkage between the lower end of said control and said rocker pedal whereby upward pivotal movement of said control lever advances said pressure pin inwardly.

19. In the hydraulic lifting unit of claim 17, a locking lever pivotally mounted upon said control lever and engageable with said handle when said control lever is pivoted to its uppermost "lowering" position.

* * * * *